(12) United States Patent
Suryadevara et al.

(10) Patent No.: US 11,267,945 B2
(45) Date of Patent: Mar. 8, 2022

(54) FLAME-RETARDANT POLYURETHANE FOAM

(71) Applicant: DDP SPECIALTY ELECTRONIC MATERIALS US, INC., Wilmington, DE (US)

(72) Inventors: Kali Ananth Suryadevara, Saginaw, MI (US); Mark W. Beach, Midland, MI (US); Dakai D. Ren, Lake Jackson, TX (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 16/778,301

(22) Filed: Jan. 31, 2020

(65) Prior Publication Data
US 2021/0238375 A1  Aug. 5, 2021

(51) Int. Cl.
*C08J 9/00* (2006.01)
*B32B 5/18* (2006.01)
*B32B 15/04* (2006.01)
*B32B 15/20* (2006.01)
*C08G 18/40* (2006.01)
*C08G 18/42* (2006.01)
*C08G 18/48* (2006.01)
*C08G 18/76* (2006.01)

(52) U.S. Cl.
CPC ............ *C08J 9/0061* (2013.01); *B32B 5/18* (2013.01); *B32B 15/046* (2013.01); *B32B 15/20* (2013.01); *C08G 18/4018* (2013.01); *C08G 18/4213* (2013.01); *C08G 18/485* (2013.01); *C08G 18/7664* (2013.01); *C08J 9/0038* (2013.01); *B32B 2307/3065* (2013.01); *C08J 2375/06* (2013.01)

(58) Field of Classification Search
CPC ..... C08J 9/0061; C08J 9/0038; B32B 15/046; B32B 15/20; B32B 2307/3065; C08G 18/4018; C08G 18/485
See application file for complete search history.

(56) References Cited

U.S. PATENT DOCUMENTS

| | | | |
|---|---|---|---|
| 4,572,865 A | 2/1986 | Gluck et al. | |
| 7,288,577 B1 * | 10/2007 | Bradford | C08G 18/48 521/107 |
| 2007/0252116 A1 * | 11/2007 | Gelmont | C08K 5/0066 252/601 |
| 2012/0302651 A1 | 11/2012 | Stowell | |
| 2017/0166695 A1 * | 6/2017 | Collin | C08J 9/146 |
| 2017/0174821 A1 * | 6/2017 | Combs | B32B 27/40 |
| 2017/0306077 A1 | 10/2017 | Chaffanjon et al. | |
| 2018/0244833 A1 * | 8/2018 | Patankar | C08G 18/4219 |

FOREIGN PATENT DOCUMENTS

WO  2017144651 A1  8/2017

OTHER PUBLICATIONS

International Search Report, dated May 28, 2021, International Application No. PCT/US2021/014842, filed Jan. 25, 2021; ISA/EPO, Authorized Officer, Lahroudy, Malgorzata.

* cited by examiner

*Primary Examiner* — Hai Vo

(57) ABSTRACT

A thermoset foam comprises from 0.2 to 4.0 wt. % of at least one aliphatic brominated polyether polyol, from 2.0 to 7.0 wt. % of at least one aromatic brominated polyester polyol, and from 2.0 to 7.5 wt. % of at least one flame retardant comprising organo-phosphate, organo-phosphonate, or organo-phosphite, wherein the ratio of the amount of aliphatic bromine expressed as a percentage of total bromine to the amount of aromatic bromine expressed as a percentage of total bromine is from 10:90 to 50:50.

7 Claims, No Drawings

FLAME-RETARDANT POLYURETHANE FOAM

BACKGROUND OF THE INVENTION

This invention pertains to a flame-retardant polyurethane foam that is particularly suitable for building insulation.

Polyisocyanurate (PIR) foam boardstock is widely used as an insulation material in roof and wall assemblies in commercial and residential buildings. As plastic foam products, PIR foams have to meet stringent fire resistance requirements in addition to their thermal resistance. Particularly, PIR foams that can pass ASTM E84 or UL 723 Tunnel fire tests in all the configurations (core, faced, slit) and the FM 4880 room corner burn test to meet Factory Mutual (FM) 4880 standard are especially desirable. Passing these tests will allow the foam products to be left exposed (no coverage required by other assemblies) on both walls and ceiling installations. To provide better fire resistance, flame retardant (FR) additive are used. These FR additives can provide increased fire resistance by gas-phase of condensed-phase mechanisms.

Current compositions that can pass the FM 4880 room corner test comprise an aryl-brominated phthalate diol, a non-reactive aliphatic brominated small molecule (n-propyl bromide, nPBr), and a phosphate tris(1-chloro-2-propyl) phosphate (TCPP). Brominated non-reactive small molecule flame retardants, such as nPBr, have become undesirable due to their high vapor pressure and high tendency to migrate out from the products, leading to ecological and worker hygiene as well as potentially reducing product fire retardancy over time. Additionally, as nPBr has a low boiling point of 71° C.; a large portion of the material would be released out of the foam prior to the foam plastic reaching its thermal degradation temperature (>200° C. for polyurethanes) during fire scenarios. This premature release of nPBr would cause inefficient use of gas-phase flame retardant thus requiring higher concentration of brominated species in the product to meet the fire retardancy requirements as denoted by fire test standards.

TCPP, which is one of the most commonly used chlorinated-phosphate esters provides both condensed and gas-phase fire retardancy in polyurethane foams. However, this material currently faces environmental scrutiny from several regulatory agencies. This scrutiny will likely lead to limitations in the future use of TCPP in commercial materials. The flame-retardant industry has developed a few alternatives to TCPP to be used in polyurethane foams; however, these materials are generally much more expensive than TCPP. Triethyl phosphate (TEP) is one low cost alternative. Nevertheless, TEP has a boiling point (209° C.) significantly lower than it's thermal degradation temperature (>300° C.). TEP is believed to be a gas phase flame retardant rather than staying in the condensed phase as its lower boiling point leads to early vaporization in a fire.

There is, therefore, an ongoing need to find cost effective solutions to provide polyurethane foams that meet customer or agency specifications and are compliant with changing ecological standards.

BRIEF SUMMARY OF THE INVENTION

A thermoset foam comprises:
from 0.2 to 4.0 wt. % of at least one aliphatic brominated polyether polyol,
from 2.0 to 7.0 wt. % of at least one aromatic brominated polyester polyol, and
from 2.0 to 7.5 wt. % of at least one flame retardant comprising organo-phosphate, organo-phosphonate, or organo-phosphite,
wherein the ratio of the amount of aliphatic bromine expressed as a percentage of total bromine to the amount of aromatic bromine expressed as a percentage of total bromine is from 10:90 to 50:50.

DETAILED DESCRIPTION OF THE INVENTION

Thermoset Foam

A "thermoset polyurethane foam" is a foam that is unable to reversibly go from a solid to flowable state upon change in temperature without degradation of the foam's polymer network.

A thermoset foam of this invention comprises:
from 0.2 to 4.0 wt. % of at least one aliphatic brominated polyether polyol,
from 2.0 to 7.0 wt. % of at least one aromatic brominated polyester polyol, and
from 2.0 to 7.5 wt. % of at least one flame retardant.

Preferably, the ratio of the amount of aliphatic bromine expressed as a percentage of total bromine to the amount of aromatic bromine expressed as a percentage of total bromine is from 10:90 to 50:50. It has been found that this ratio of components significantly improves the gas phase flame retardants efficiency. A surprising find was the passing of a full room corner test at about half the bromine content (1.6% Br) as compared to the current commercial technology (3.0% Br) without impacting thermal insulation and other physical properties. Moreover, the aliphatic Br/aromatic Br ratio is significantly lower than in current technology.

An exemplary aliphatic brominated polyol is IXOL® B-251 or IXOL® M-125 available from Solvay Specialty Chemicals, Houston, Tex.

An exemplary aromatic brominated polyol is SAYTEX® RB-9170 from Albemarle, Charlotte, N.C.

Flame Retardant

A preferred flame retardant is a phosphorus based flame retardant.

Suitable flame-retardants include organo-phosphate, organo-phosphonate, organo-phosphite or an oligomeric alkyl phosphate. An exemplary organo-phosphate is triethyl phosphate.

In one embodiment, the flame-retardant is a blend of triethyl phosphate and oligomeric alkyl phosphate, wherein the ratio of triethyl phosphate to oligomeric alkyl phosphate is preferably from 90:10 to 50:50.

An exemplary alkyl phosphate is triethyl phosphate.

Exemplary alkyl phosphates are Fyrol® PNX from ICL Industrial Products, Tarrytown, N.Y., EXOLIT® OP 550 or OP 560 from Clariant, Muttenz, Switzerland, butyl diphenyl phosphate, dibutyl phenyl phosphate and triphenyl phosphate.

Other Components of the Foam

In some embodiments, an organosilicone surfactant may also be present to aid in reducing blister size during a fire event.

The thermoset foam can contain other components including one or more than one selected from interfacial agents, phosphorus-containing compounds, chlorine containing compounds, additional brominated flame retardants, preservatives, antioxidants, catalyst, colorants, bitterants, fillers, infrared attenuators (such as carbon black, graphite and titanium dioxide) and residual blowing or frothing agent.

The foam may be prepared by any suitable method known in the art, an exemplary method being described in U.S. Pat. No. 4,572,865.

Composite Structure

A thermoset foam as described above may be used to make a composite structure such as flat panels having at least one facesheet bonded to at least one exterior surface of the foam. Preferably, there is at least one facesheet bonded to at least one exterior surface of the foam. The facesheet material can be a plastic sheet or plate, resin impregnated fibrous yarns (prepreg), wood or metal. A typical metal sheet is 24 or 26 gauge galvanized steel. A preferred metal is aluminum. The facesheets are attached to the foam under pressure and usually with heat by an adhesive film or from the resin in the prepreg. The curing may be carried out in a press, an oven or an autoclave. Such techniques are well understood by those skilled in the art.

Test Methods

ASTM E84-19b Standard Test Method for Surface Burning Characteristics of Building Materials.

UL723-11 Standard Test Method for Surface Burning Characteristics of Building Materials.

FM 4880:2017 Evaluating the Fire Performance of Insulated Building Panel Assemblies and Interior Finish Materials.

NFPA 286 (2019) Standard Methods of Fire Tests for Evaluating Contribution of Wall and Ceiling Interior Finish to Room Fire Growth.

UL 1715 (1997) Standard for Fire Test of Interior Finish Material.

Other test methods are listed below:

| Property or Characteristic | Determination | Reference |
| --- | --- | --- |
| PMDI functionality | Standard Test Method | ASTM D2752-06e |
| Free glycol | Proton NMR | Kadkin, O, J. Polym. Sci. A, 41, 1120 (2003) http://www.vanderbilt.edu/AnS/Chemistry/omrg/Articles/JPSa_2003_1114.pdf |
| Polyol Equivalent Weight | Calculated based on MW and number of reactive sites | Szycher, M, Szycher's Handbook of Polyurethanes, 2nd Edition, CRC Press, New York, Appendix D.2, pg 1088 (2013). |
| % NCO | Standard Test Method | ASTM D2572-06e |
| NCO Index | 100 × (NCO equivalents/OH equivalents) | Szycher, M, Szycher's Handbook of Polyurethanes, 2nd Edition, CRC Press, 7.4.1, New York, pg 199 (2013). |
| Trimer content | Calculation defined in the reference | Ashida, K, Editor, Polyurethane and Related Foams: Chemistry and Technology, CRC Press, New York, Chapter 5, Polyisocyanurate Foams pp 106-107 (2006) |
| Cream Time | This is the time between the mixing all components (t = 0) and the visual observation of color change - typically a change in opacity of the mixture. | Szycher, M, Szycher's Handbook of Polyurethanes, 2nd Edition, CRC Press, 7.4.1, New York, pg 300 (2013). |
| Gel Time | This is the time between the mixing all components (t = 0) and the visual observation of color change - typically a change in opacity of the mixture. | Szycher, M, Szycher's Handbook of Polyurethanes, 2nd Edition, CRC Press, 7.4.1, New York, pg 300 (2013). |
| Thermal Insulation (R/inch), initial | Standard Test Method | ASTM C518-17 |
| Cone Calorimetry, Peak HRR (kW/m2) | Standard Test Method | ASTM E1354-17 |
| Cone Calorimetry, Peak SEA (m^2/kg) | Standard Test Method | ASTM E1354-17 |
| NBS Smoke Density, Time to Max Ds (s) | Standard Test Method | ASTM E662-19 |
| Density (lb/cubic ft) | Standard Test Method | ASTM D1622-14 |

EXAMPLES

The following examples are given to illustrate the invention and should not be interpreted as limiting it in any way. Examples prepared according to the current invention are indicated by numerical values. Control or Comparative Examples are indicated by letters.

Materials used in the PIR formulations are given in Table 1 and the formulations in Table 2. All parts in Table 2 are by parts per hundred of polyol unless otherwise indicated. Table 3 summarizes the percentages of certain components in the formulations. Fire testing results of comparative and inventive examples are in Table 4.

TABLE 1

Raw Materials

| Reference | Supplier | Brief Description |
|---|---|---|
| IP9005 | Dow Chemical Company, Midland, MI | Polyester polyol |
| T563 | Terol ® 563 from Huntsman, The Woodlands, TX | Aromatic polyester polyol |
| HT5502 | Tereate ® HT5502 from Invista, Seaford, DE | Aromatic polyester polyol |
| PAPI 20 | Dow Chemical Company, Midland, MI | Polymeric methylene diphenyldiisocyanate (PMDI) |
| PAPI 27 | Dow Chemical Company, Midland, MI | Polymeric methylene diphenyldiisocyanate (PMDI) |
| V504 | Vorasurf ® V504 from Dow Chemical Company, Midland, MI | Polyethylene oxide -butylene oxide-polyethylene oxide triblock polymer surfactant |
| TMR 20 | Dabco ® TMR20 from Evonik Industries, Parsippany, NJ | A potassium carboxylate salt catalyst |
| 470X | Voranol ® 470X from Dow Chemical Company, Midland, MI | A Mannich polyether 30 30 polyol |
| 9887E | Pel-Cat 9887E from Ele Corporation, McCook, IL | Catalyst blend |
| 9887F | Pel-Cat 9887F from Ele Corporation, McCook, IL | Catalyst blend |
| nPBR | | 1 bromopropane blowing agent |
| TBP | Tetrabromophthalatediol from Chemtura Corporation, Philadelphia, PA | Flame retardant |
| TCCP | | Tris(chloroisopropyl)phosphate flame retardant |
| B251 | Ixol ™ B251 from Solvay, Houston, TX | Aliphatic brominated polyol - triethylphosphate flame retardant blend. |
| TEP | | Triethylphosphate flame retardant |
| PNX | Fryol ™ PNX from ICL Industrial Products, Creve Coeur, MO | Alkylphosphate flame retardant |
| Pentane | | Blowing agent comprising 80 wt. % c-C5 (CAS nr. 287-92-3) and 20 wt. % i-C5 (CAS nr. 78-78-4) |
| DMB | | 2,2 dimethylbutane blowing agent |
| 1233zd | | 1-chloro-3,3-trifluoropropene blowing agent. Mixture of E- and Z- isomers |
| Water | | Deionized water |

TABLE 2

PIR Formulations

| Component | Comp. Ex. A | Comp. Ex. B | Ex. 1 | Ex. 2 | Ex. 3 |
|---|---|---|---|---|---|
| IP9005 | | | 100 | | 100 |
| T563 | | | | 100 | |
| HT5502 | 100 | 100 | | | |
| PAPI 20 | 346 | 346 | 609 | 725 | 610 |
| PAPI 27 | | | | | |
| V504 | 4 | 4 | 5.9 | 7.2 | 5.98 |
| XX-5314 | | | | | 12.2 |
| TMR 20 | | | 10.43 | 14.22 | 11 |
| 470X | | | 8.82 | 12.05 | 9.3 |
| 9887E | 7.5 | | | | |
| 9887F | | 6.7 | | | |
| nPBr | 15.91 | | | | |
| TBP | 12.7 | 12.8 | 28.15 | 39.79 | 28.67 |
| TCPP | 20.1 | 19.2 | | | |
| B251 | | | 4.27 | 23.29 | 4.35 |
| TEP | | | 27.64 | 37.27 | 28.99 |
| PNX | | | 4 | | 4.08 |
| water | 0.8 | 0.8 | 2.5 | 2.7 | 2.5 |

TABLE 2-continued

PIR Formulations

| Component | Comp. Ex. A | Comp. Ex. B | Ex. 1 | Ex. 2 | Ex. 3 |
|---|---|---|---|---|---|
| Pentane | 29.2 | 27.1 | 46.51 | 59.6 | 49.96 |
| 1233zd | | 12.8 | | | |

TABLE 3

Component Percentages

| Component | Comp. Ex. A | Comp. Ex. B | Ex. 1 | Ex. 2 | Ex. 3 |
|---|---|---|---|---|---|
| Trimer % | 17.7 | 17.8 | 18.0 | 18.4 | 17.9 |
| Pentane % | 5.45 | 5.12 | 5.49 | 5.84 | 5.76 |
| Br % | 3 | 1.09 | 1.59 | 2.39 | 1.58 |
| Aliphatic Br % | 1.93 | 0 | 0.16 | 0.71 | 0.16 |
| Cl % | 1.64 | 1.66 | 0.03 | 0.16 | 0.03 |
| Halogen % | 4.64 | 2.75 | 1.62 | 2.55 | 1.61 |
| P % | 0.46 | 0.47 | 0.64 | 0.62 | 0.66 |

TABLE 4

Fire Test Results

| Test Regime | Comp. Ex. A | Comp. Ex. B | Ex. 1 | Ex. 2 | Ex. 3 |
|---|---|---|---|---|---|
| ASTM E84 or UL 723 core FSI | Pass | Pass | Pass | Pass | Pass |
| ASTM E84 or UL 723 slit FSI | Pass | Fail | Pass | Pass | Pass |
| NFPA 286 Walls Only | Pass | N/A | Pass | Pass | Pass |
| UL1715 Walls and Ceilings | Pass | Fail | Fail | Pass | Pass |

The data in Table 3 shows:

Comp Ex B: without nPBr, the foam boards did not pass E84 slit configuration or UL1715 even though the pentane % was lowered and had relatively high halogen content.
Ex 1: with proper Br release profile, the boards were able to pass E84 slit with much lower total halogen.
Ex 2: with proper Br release profile, by increasing the reactive aliphatic bromine %, enabled the boards to pass E84 slit and UL 1715 in walls and ceilings configuration.
Ex 3: with synergy effect between FR package and silicon surfactant, the boards were able to pass UL1715 full room corner with lower total halogen compared to the control (Comp Ex A).

We claim:

1. A thermoset polyurethane foam made from a formulation, the formulation comprising at least one isocyanate, at least one bromine-free polyol, at least one aliphatic brominated polyether polyol, and at least one aromatic brominated polyester polyol;
    the formulation being free of n-propyl bromide (nPBr) and tris(1-chloro-2-propyl) phosphate (TCPP),
    the formulation comprising:
        from 0.2 to 4.0 wt. % of at least one reactive aliphatic brominated polyether polyol,
        from 2.0 to 7.0 wt. % of at least one aromatic brominated polyester polyol, and
        from 2.0 to 7.5 wt. % of at least one flame retardant comprising organo-phosphate, organo-phosphonate, or organo-phosphite,
        wherein the ratio of the amount of aliphatic bromine expressed as a percentage of total bromine to the amount of aromatic bromine expressed as a percentage of total bromine is from 10:90 to 50:50: and
        wherein the foam passes ASTM E84 and UL 723 tunnel fire tests in core, faced, and slit configurations,
    the thermoset polyurethane foam having a total bromine content of 1.58 to 2.39 percent and a total halogen content of 1.61 to 2.55 percent.

2. The foam of claim 1 wherein the flame retardant further comprises an oligomeric alkyl phosphate.

3. The foam of claim 2 wherein the flame retardant is a blend of triethyl phosphate and oligomeric alkyl phosphate.

4. The foam of claim 3 wherein the ratio of triethyl phosphate to oligomeric alkyl phosphate is from 90:10 to 50:50.

5. A composite comprising the foam of claim 1 and at least one facesheet attached to at least one external surface of the foam.

6. The composite of claim 5 wherein the facesheet comprises resin impregnated fiber, plastic, wood or metal.

7. The composite of claim 6 wherein the metal is aluminum.

* * * * *